(12) United States Patent
Clark

(10) Patent No.: US 6,694,924 B2
(45) Date of Patent: Feb. 24, 2004

(54) MEDICAL RECORD COAT FOR DOGS

(76) Inventor: Barbara L. Clark, P.O. Box 496, Bedminster, NJ (US) 07921

( * ) Notice: Subject to any disclaimer, the term of this patent is extended or adjusted under 35 U.S.C. 154(b) by 0 days.

(21) Appl. No.: 10/092,291

(22) Filed: Mar. 6, 2002

(65) Prior Publication Data

US 2003/0168021 A1 Sep. 11, 2003

(51) Int. Cl.[7] .................................................. A01K 13/00
(52) U.S. Cl. ...................................... 119/850; 119/174
(58) Field of Search ................................ 119/850, 671, 119/678, 174; 54/79.1, 79.2, 79.4

(56) References Cited

U.S. PATENT DOCUMENTS

| | | | | |
|---|---|---|---|---|
| 2,408,575 A | * | 10/1946 | Norvig ........................ 508/354 |
| 3,150,641 A | * | 9/1964 | Kesh ........................... 119/678 |
| 4,355,600 A | * | 10/1982 | Zielinski ...................... 119/850 |
| 5,003,756 A | | 4/1991 | Mazzotta, Sr. |
| 5,060,597 A | * | 10/1991 | Fredericks ................... 119/678 |
| 5,137,508 A | * | 8/1992 | Engman ....................... 602/79 |
| 5,447,124 A | * | 9/1995 | Pollock et al. .............. 119/850 |
| 6,138,611 A | | 10/2000 | Thielemann |
| 6,427,421 B1 | * | 8/2002 | Belmont et al. .............. 53/412 |
| 6,431,123 B1 | * | 8/2002 | Hibbert ....................... 119/850 |

* cited by examiner

Primary Examiner—Charles T. Jordan
Assistant Examiner—Kimberly S. Smith
(74) Attorney, Agent, or Firm—Wendy W. Koba

(57) ABSTRACT

A medical record coat for a dog comprises a transparent coat upon which can be marked the location and size of various tumors as they are discovered on the animal's body. The ability to maintain a visual record of the tumor history of the dog allows the treating professional to track the treatment process of the animal. The medical record coat is then maintained as part of the medical history of the animal.

3 Claims, 2 Drawing Sheets

MEDICAL RECORD COAT FOR DOGS

TECHNICAL FIELD

The present invention relates to a coat for covering a dog and, more particularly, to a transparent coat that is fit over a dog and used to mark the locations of lypoma and other tumors as a visible record of tumor location and size.

BACKGROUND OF THE INVENTION

There are various breeds of dogs that are particularly sensitive to experiencing repetitive onsets of various types of tumors, most often lypomas. Lypomas are fatty tumors that are most often benign, but may be removed for the overall health and well-being of the animal.

In most cases, a paper medical record is maintained for the treated animal, and the doctor may simply draw an illustration of the dog and mark locations on the picture where one or lypomas have been removed. The size of the tumor may also be indicated on the chart. Alternatively, the paper medical record may not include a picture of the animal, and merely use a written description to define the area and size of removed lypomas.

There are problems that exist with this type of record-keeping, the most common being that the record is lost. It may also frequently occur that the information regarding the size and location of a lypoma is generalized and vague (i.e., a treating doctor may simply record "3 mm tumor removed from left shoulder"). Thus, when a lypoma recurs in the left shoulder area of the same animal, it may be difficult to determine if this tumor is in the same location as the previous tumor, or in a different location. Additionally, it is difficult to keep accurate records of the exact size and shape of each tumor, making it difficult to track growth in various tumors over time. Therefore, for the purposes of accurate treatment and maintaining sufficient and reliable medical records, another method of recording this information is desirable.

SUMMARY OF THE INVENTION

The need remaining in the prior art is addressed by the present invention, which relates to a coat for covering a dog and, more particularly, to a transparent coat that is fit over a dog and used to mark the locations of lypoma and/or other tumors as a visible record of tumor locations and treatment dates.

In accordance with the present invention, a transparent medical record coat is placed around a dog being treated. The treatment professional can then use a permanent marker (or any suitable writing device) to mark the size and location of the tumor, as well as trace the complete outline of the tumor on the coat. The date may also be recorded with the tumor size and location information. This particular coat will then be tagged as associated with this particular animal and become a part of the dog's medical history. By being able to trace the actual outline of the tumor prior to treatment, the doctor is able to exactly define the size and location of the tumor. When the animal returns for follow-up visits, the coat is then put on the animal again, and the previously-drawn tumor outline is compared with the current condition of the dog in that area. Thus, changes in the size and/or shape of the tumor are easy to determine by comparing the previously-drawn outline against the current condition of the tumor. Further, if other tumors have appeared since a prior visit, these new tumor locations (and, for example, the date) may be marked on the coat.

It is an important aspect of the present invention that these tumor markings on the coat are permanent markings and become part of the animal's medical record. Thus, if the animal is then treated by any other doctor, the coat may be taken along and reviewed by that person. Additionally, the visual aspect of being able to mark the size and location of each tumor is invaluable to the treating doctor.

It is an additional feature of the present invention that the medical record coat is made of a size to adequately fit the dog, covering all body areas where tumors are likely to occur. In one embodiment, three different sizes (small, medium, and large) have been found adequate to fit various breeds of dogs. The coat itself preferably comprises a single piece of transparent material, but may also be formed of two pieces which are joined together (e.g., an upper torso piece and a lower torso piece).

In another embodiment of the present invention, separate leg pieces may be included with the medical record coat, where separate transparent sections are fit around each leg. Each leg piece may be marked to include the identification of the particular animal being treated, in order to keep the leg pieces from becoming lost or misplaced.

Other and further aspects of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
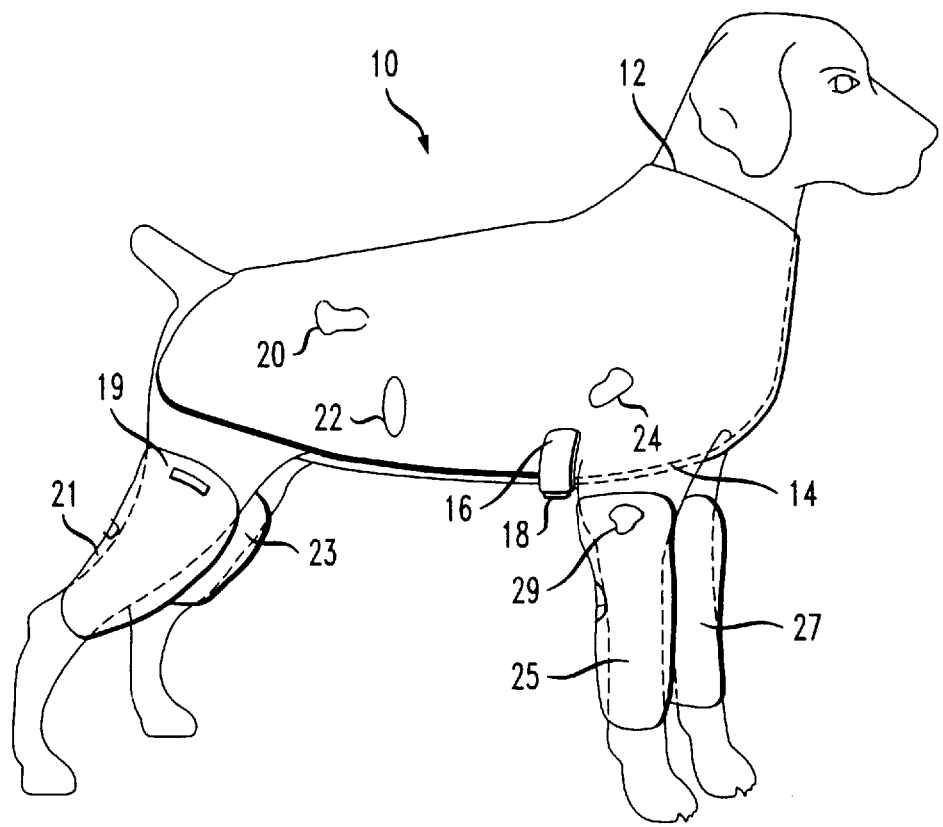
FIG. 1 illustrates an exemplary medical record coat of the present invention, as it is fit around an averaged-sized dog.
Figure 2:
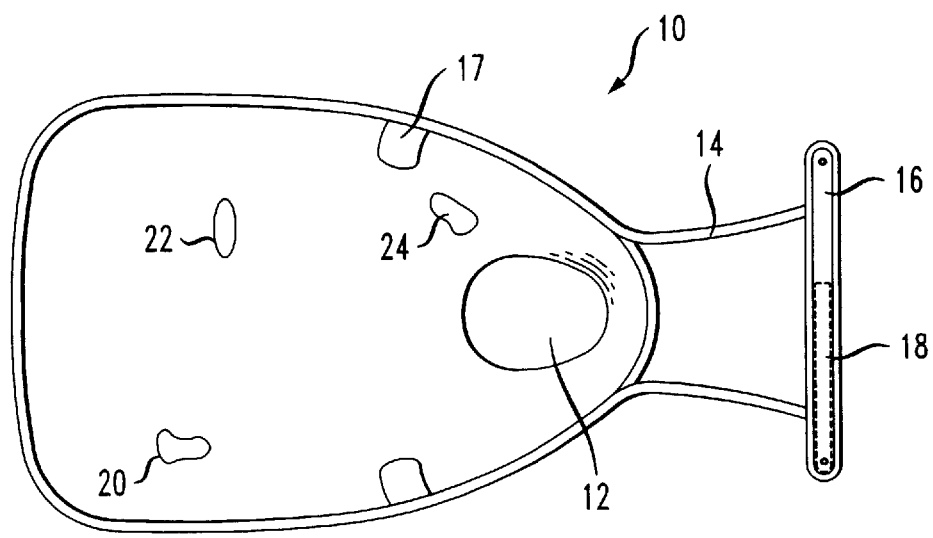
FIG. 2 shows the medical record coat of FIG. 1, after it has been removed from the dog, showing the markings of tumor locations.

FIG. 1 illustrates an exemplary medical record coat 10 of the present invention, as it is fit around an average-sized dog. In accordance with the present invention, coat 10 comprises a transparent material, for example, a relatively thick plastic, upon which a marking pen can be used to permanently indicate the location and size of various growths and tumors, such as lypomas. Exemplary coat 10 of FIG. 1 comprises a single piece of transparent material and includes an opening 12 for inserting the coat over the dog's head. FIG. 2 is a view of the coat in its "open" form, clearly showing the location of opening 12. A panel 14 of coat 10 is formed to cover the chest area of the animal (including the underside of the torso), wrapping between the forward legs and secured around the dog with a strap 16. Strap 16 preferable includes a removable adhesive material that mates with an adhesive section 17 on coat 10. One or more similar removable adhesive sections (not shown) maybe used to insure the secure placement of medical record coat 10 around the dog. An identification label 18, with the name and other identifying information of the dog is also included on coat 10, to avoid "mixing up" the coats of various animals. In the embodiment as illustrated in FIG. 1, identification label 18 is illustrated as formed on strap 16. The location of identification label 18 is not relevant to the purposes of the present invention.

In accordance with the present invention, once medical record coat 10 is secured on the animal, the treating professional may look through the transparent material of the coat and identify the location of various growths. A marking pen is then used to outline the growth. The date of detection may also be recorded on or next to the marked growth location (the date and information about the growths should also be recorded in the medical history file for this particular animal). FIGS. 1 and 2 illustrate exemplary markings for three tumors, denoted 20, 22 and 24, where the size and shape of these markings is exaggerated for the purposes of illustration. A measurement (in centimeters or inches, as preferred), can then easily be made and this information can be included in a paper medical record history of the animal. Thus, each time the animal returns for a check-up or treatment, his coat may be repositioned on his body and the size/location of the growths compared against the markings made in the prior visit. Clearly, this is a significant aid in properly treating the animal. Further, additional growths found on return visits may be similarly marked, allowing the treating professional to maintain a complete medical history of tumor growth.

As mentioned above, a medical record coat of the present invention may include separate leg pieces, since it is possible for lypomas (or other tumors) to occur on the legs. FIG. 1 illustrates coat 10 as further comprising a set of four transparent leg pieces 21, 23, 25 and 27, each piece fit around a different leg of the animal. Each piece should be marked to identify the associated leg (e.g., "left hind leg"), and should also include information identifying the particular dog. A label segment 19 is illustrated on leg piece 21, where such a segment may be used to record this information. Removable adhesive attachments may be used to secure each leg piece to the animal. As with the torso portion of the medical record coat, the location and size of tumors are marked on the appropriate leg piece. An exemplary marking 29 is illustrated in FIG. 1.

Figure 3:
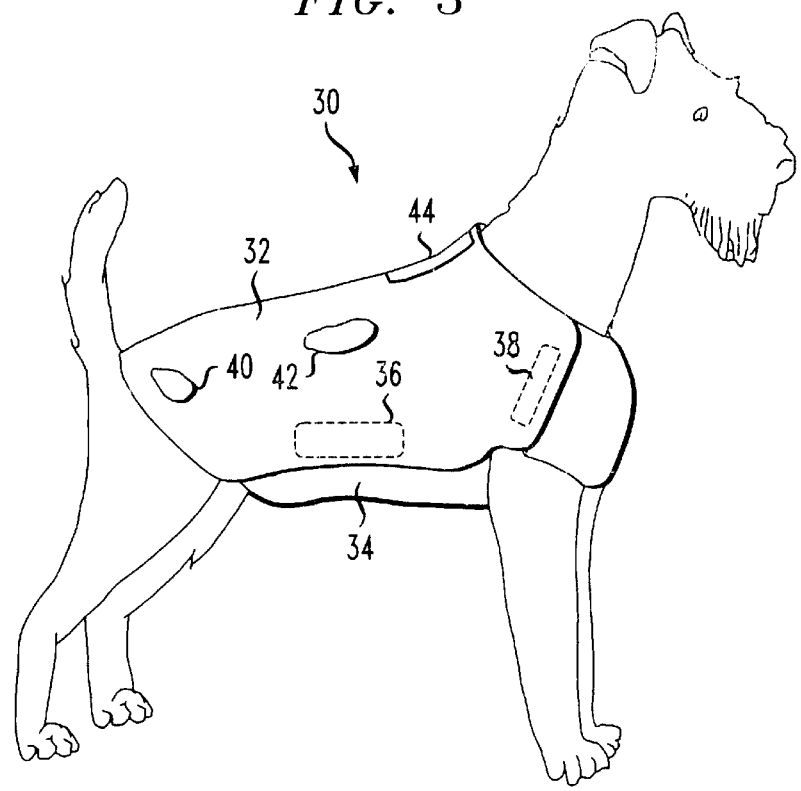
FIG. 3 illustrates an alternative embodiment of a medical record coat of the present invention, as it is fit around a small-sized dog.
Figure 4:
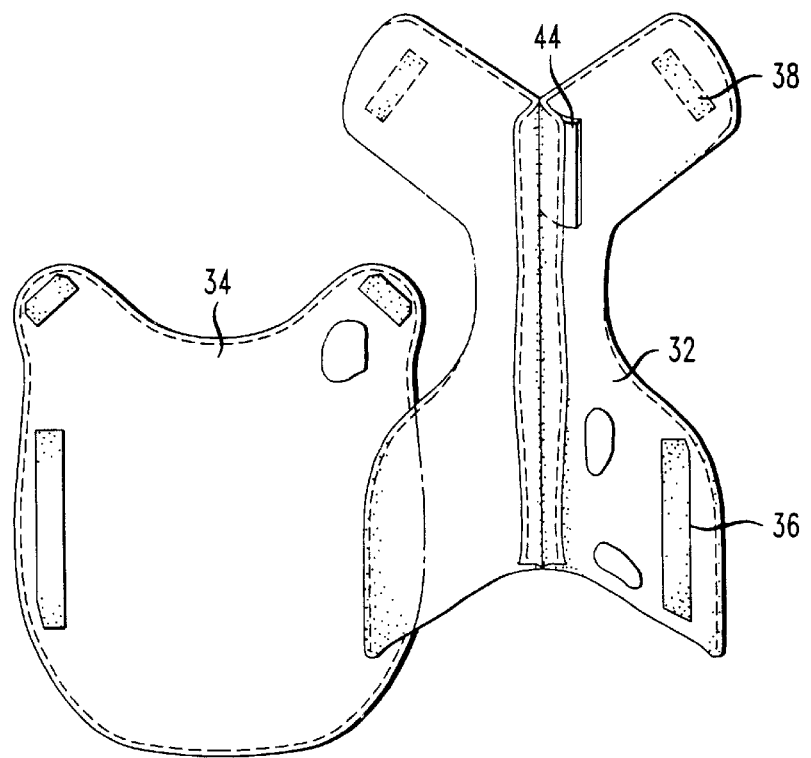
FIG. 4 contains a view of the medical record coat of FIG. 3.

FIG. 3 illustrates an alternative embodiment of a medical record coat 30 of the present invention, where FIG. 4 shows a top view of this exemplary coat. In this case, coat 30 comprises two pieces 32 and 34, for fitting around the upper and lower torso sections of the animal, in contrast to pulling a coat over the dog's head, as is required for coat 10 of FIG. 1. In general, it is to be understood that the particular configuration of the coat, including the number of pieces and the way the coat is fit around the dog is not germane to the teachings of the present invention. Referring back to FIG. 3, coat 30 is illustrated as wrapped around a relatively small-sized dog, where adhesive attachment means 36 and 38 are used to secure piece 32 to piece 34. As with the coat discussed above, coat 30 comprises a transparent material, such as a relatively heavy-duty, but pliable plastic, upon which permanent markings can be made. In the particular illustration of FIGS. 3 and 4, a pair of tumor locations 40 and 42 are illustrated as being marked, including information regarding the date and, if desired, an accurate recording of the tumor dimensions. An identification label 44 is shown as included on coat 30.

It is to be understood that the embodiments of the present invention as discussed above are exemplary only, and that a medical record coat of the present invention may comprise any desired configuration, as long as the coat is formed of a transparent material that a treating professional may see and feel through. Heavy-duty plastic has been found to be a preferred material. Moreover, the actual size of the coat is not defined by the terms of the invention, but is only required to be a proper size to adequately locate and identify the location of tumors on the animal. In general, a set of three sizes (small, medium and large) have been found to fit most breeds. Indeed, the spirit and scope of the present invention is considered to be limited only by the claims appended hereto.

What is claimed is:

1. A method of tracking the location and size of tumors forming on the body of a dog, the method comprising the steps of:
   a) fitting a coat of transparent material around a dog to be treated, said coat comprising a transparent material upon which permanent markings can be made;
   b) labeling said cat with particular information identifying the dog being treated; and
   c) marking, on said coat of transparent material, the location and size of each tumor found on the body of the dog.

2. The method as defined in claim 1 wherein the method further comprises the step of:
   d) including the current date with the markings made in step c).

3. The method as defined in claim 1 wherein the method further comprises the step of repeating the marking step c) on subsequent treatment sessions.

* * * * *

UNITED STATES PATENT AND TRADEMARK OFFICE
CERTIFICATE OF CORRECTION

PATENT NO. : 6,694,924 B2
DATED : February 24, 2004
INVENTOR(S) : Barbara L. Clark It is certified that error appears in the above-identified patent and that said Letters Patent is hereby corrected as shown below:

Column 4,
Line 34, should be corrected to read: -- labeling said coat with particular information identifying ... --

Signed and Sealed this

First Day of June, 2004

JON W. DUDAS
*Acting Director of the United States Patent and Trademark Office*